United States Patent
Shpiner et al.

(10) Patent No.: US 10,250,635 B2
(45) Date of Patent: Apr. 2, 2019

(54) DEFENDING AGAINST DOS ATTACKS OVER RDMA CONNECTIONS

(71) Applicant: Mellanox Technologies, Ltd., Yokneam (IL)

(72) Inventors: Alex Shpiner, Nesher (IL); Liran Liss, Atzmon (IL); Matty Kadosh, Hadera (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 15/652,285

(22) Filed: Jul. 18, 2017

(65) Prior Publication Data

US 2019/0028505 A1    Jan. 24, 2019

(51) Int. Cl.
*H04L 29/06* (2006.01)

(52) U.S. Cl.
CPC ...... *H04L 63/1458* (2013.01); *H04L 63/1425* (2013.01); *H04L 67/42* (2013.01); *H04L 69/16* (2013.01)

(58) Field of Classification Search
CPC ......... H04L 69/16; H04L 49/90; H04L 47/20; H04L 47/30; G06F 15/17331; H04W 24/02
See application file for complete search history.

(56) References Cited

U.S. PATENT DOCUMENTS

| | | | |
|---|---|---|---|
| 2003/0135625 A1* | 7/2003 | Fontes | H04L 63/12 709/228 |
| 2013/0080562 A1* | 3/2013 | Fox | H04L 69/08 709/212 |
| 2017/0033889 A1* | 2/2017 | Ma | H04L 69/169 |

OTHER PUBLICATIONS

Brookings (Riding the Mobile Wave: The Future of Mobile Computing a Conversation with CEO of Microstrategy Michael Saylor, retreived from: https://www.brookings.edu/wp-content/uploads/2012/09/20121005_mobile_wave.pdf, 2012) (Year: 2012).*
Eddy., "TCP SYN Flooding Attacks and Common Mitigations", IETF Request for Comments (RFC) 4987, 19 pages, Aug. 2007.
Simpson., "TCP Cookie Transactions (TCPCT)", IETF Request for Comments (RFC) 6013, 37 pages, Jan. 2011.

* cited by examiner

*Primary Examiner* — Brian F Shaw
(74) *Attorney, Agent, or Firm* — Kligler & Associates

(57) ABSTRACT

A processor is configured to receive, from a client, a first message indicating a request to establish a connection between the client and a server, to ascertain that the first message does not include any cookie satisfying one or more criteria, to send, to the client, a second message that includes a first cookie, without allocating an endpoint on the server for the connection, in response to ascertaining that the first message does not include any cookie satisfying the criteria, to receive subsequently, from the client, a third message, to ascertain that the third message includes a second cookie, and that the second cookie satisfies the criteria, to allocate the endpoint for the connection in response to ascertaining that the second cookie satisfies the criteria, and to send, to the client, a fourth message indicating that the server is ready to receive data communication at the allocated endpoint.

21 Claims, 3 Drawing Sheets

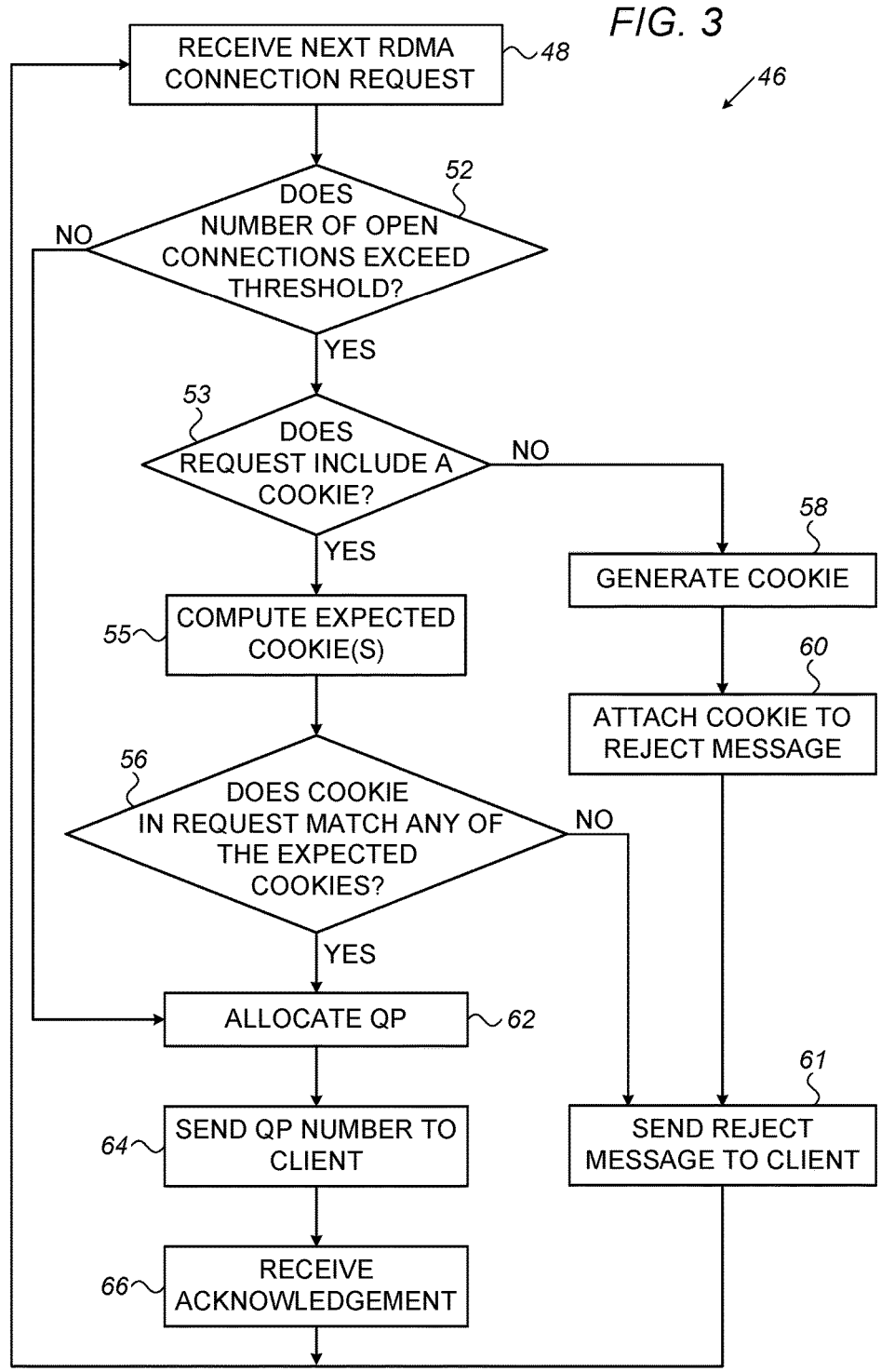

US 10,250,635 B2

DEFENDING AGAINST DOS ATTACKS OVER RDMA CONNECTIONS

FIELD OF THE INVENTION

The present invention relates to the field of computer network security.

BACKGROUND

In the "three-way handshake" used for the setup of Transmission Control Protocol (TCP) connections, a client device (or "client") first sends a TCP Synchronize (SYN) message to the server, which indicates a request to establish a connection with the server. The server then replies to the client with a Synchronize-Acknowledgement (SYN-ACK) message, which indicates that the server is ready to receive data communication from the client over the connection. The client then replies to the server with an Acknowledge (ACK) message, which indicates that the client is ready to receive data communication from the server over the connection. Data communication may then be exchanged between the server and the client.

A TCP SYN flooding attack is a denial-of-service (DoS) method affecting hosts that run TCP server processes. These types of attacks, and various countermeasures against them, are described, for example, by Eddy in "TCP SYN Flooding Attacks and Common Mitigations," published by the Internet Engineering Task Force (IETF) as Request for Comments (RFC) 4987 (August, 2007). A particular mechanism for guarding against simple flooding attacks is provided by TCP Cookie Transactions (TCPCT), which are described, for example, by Simpson in "TCP Cookie Transactions (TCPCT)," published by the IETF as RFC 6013 (January, 2011).

Remote Direct Memory Access (RDMA), which includes several varieties such as Infiniband RDMA and RDMA over Converged Ethernet (ROCE), is a connection protocol providing direct memory access from the memory of one computer into that of another computer. An RDMA connection may be established by a handshake similar to the above-described three-way handshake for TCP, whereby a Request (REQ) message, a Reply (REP) message, and a Ready-to-use (RTU) message function similarly to, respectively, the SYN, SYN-ACK, and ACK messages.

SUMMARY OF THE INVENTION

There is provided, in accordance with some embodiments of the present invention, apparatus including one or more communication ports and a processor. The processor is configured to receive via the communication ports, from a client device, a first message indicating a request to establish a connection between the client device and a server. The processor is further configured to ascertain that the first message does not include any cookie satisfying one or more criteria, and to send, to the client device, a second message that includes a first cookie, without allocating an endpoint on the server for the connection, in response to ascertaining that the first message does not include any cookie satisfying the one or more criteria. The processor is further configured to receive subsequently, from the client device, a third message, and to ascertain that the third message includes a second cookie, and that the second cookie satisfies the one or more criteria. The processor is further configured to allocate the endpoint for the connection, in response to ascertaining that the second cookie satisfies the one or more criteria, and to send, to the client device, a fourth message indicating that the server is ready to receive data communication at the allocated endpoint.

In some embodiments, the connection is a Remote Direct Memory Access (RDMA) connection, and the allocated endpoint is an allocated Queue Pair (QP).

In some embodiments, the fourth message indicates a QP Number of the allocated QP, and the processor is further configured to receive from the client device, subsequently to sending the fourth message to the client device, a fifth message indicating that the client device is ready to receive data communication from the allocated QP.

In some embodiments,
the processor is further configured to designate a QP Number,
the second message indicates the QP Number, and
the processor is configured to allocate the QP such that the QP has the designated QP Number.

In some embodiments, the second message indicates a refusal to establish the connection.

In some embodiments,
the processor is configured to ascertain that the first message does not include any cookie satisfying the one or more criteria by ascertaining that the first message does not include any cookie at all, and
the processor is configured to send the second message that includes the first cookie in response to ascertaining that the first message does not include any cookie at all.

In some embodiments, the processor is further configured:
to receive, from another client device, another request to establish another connection between the other client device and the server,
to ascertain that the other request includes a third cookie that does not satisfy the one or more criteria, and
to send to the other client device, in response to ascertaining that the other request includes the third cookie that does not satisfy the one or more criteria, another message that indicates a refusal to establish the other connection and does not include any cookie.

In some embodiments, the processor is further configured to compute the first cookie from: a current time, and an identifier of the client device.

In some embodiments,
the processor is further configured to ascertain that a number of open connections with the server exceeds a predefined threshold, and
the processor is configured to send the second message without allocating the endpoint in response to ascertaining that the number of open connections exceeds the predefined threshold.

In some embodiments, the processor is configured to send the second message without allocating the endpoint and without dedicating any memory on the server to the request.

There is further provided, in accordance with some embodiments of the present invention, apparatus including one or more communication ports and a processor. The processor is configured to send, via the communication ports, a first message indicating a request to establish a connection between the processor and a server over a connection protocol that requires an endpoint on the server to be allocated for the connection. The processor is further configured to receive, subsequently to sending the first message, a second message that includes a first cookie, and to send, in response to receiving the second message, a third message that includes a second cookie having a value that is derived from a value of the first cookie. The processor is further configured to receive, subsequently to sending the third message, a fourth message indicating that the server is ready to receive data communication at the allocated endpoint.

In some embodiments, the value of the second cookie is identical to the value of the first cookie.

In some embodiments, the connection is a Remote Direct Memory Access (RDMA) connection, and the allocated endpoint is an allocated Queue Pair (QP).

In some embodiments, the fourth message indicates a QP Number of the allocated QP, and the processor is further configured to send to the server, subsequently to receiving the fourth message, a fifth message indicating that the processor is ready to receive data communication from the allocated QP.

In some embodiments, the second message indicates a QP Number of the allocated QP, and the third message indicates that the processor is ready to receive communication from the allocated QP.

In some embodiments, the second message indicates a refusal to establish the connection.

There is further provided, in accordance with some embodiments of the present invention, a method including receiving, from a client device, a first message indicating a request to establish a connection between the client device and a server. The method further includes ascertaining that the first message does not include any cookie satisfying one or more criteria, and, in response to ascertaining that the first message does not include any cookie satisfying the one or more criteria, sending, to the client device, a second message that includes a first cookie, without allocating an endpoint on the server for the connection. The method further includes, subsequently, receiving, from the client device, a third message, and ascertaining that the third message includes a second cookie, and that the second cookie satisfies the one or more criteria. The method further includes, in response to ascertaining that the second cookie satisfies the one or more criteria, allocating the endpoint for the connection, and sending, to the client device, a fourth message indicating that the server is ready to receive data communication at the allocated endpoint.

There is further provided, in accordance with some embodiments of the present invention, a method including sending, by a client device, a first message indicating a request to establish a connection between the client device and a server over a connection protocol that requires an endpoint on the server to be allocate for the connection. The method further includes, subsequently to sending the first message, receiving a second message that includes a first cookie, and, in response to receiving the second message, sending a third message that includes a second cookie having a value that is derived from a value of the first cookie. The method further includes, subsequently to sending the third message, receiving a fourth message indicating that the server is ready to receive data communication at the allocated endpoint.

The present invention will be more fully understood from the following detailed description of embodiments thereof, taken together with the drawings, in which:

BRIEF DESCRIPTION OF THE DRAWINGS

FIG. 3 is a flow diagram for a method for defending against a DoS attack, in accordance with some embodiments of the present invention.

DETAILED DESCRIPTION OF EMBODIMENTS

Overview

Figure 1:
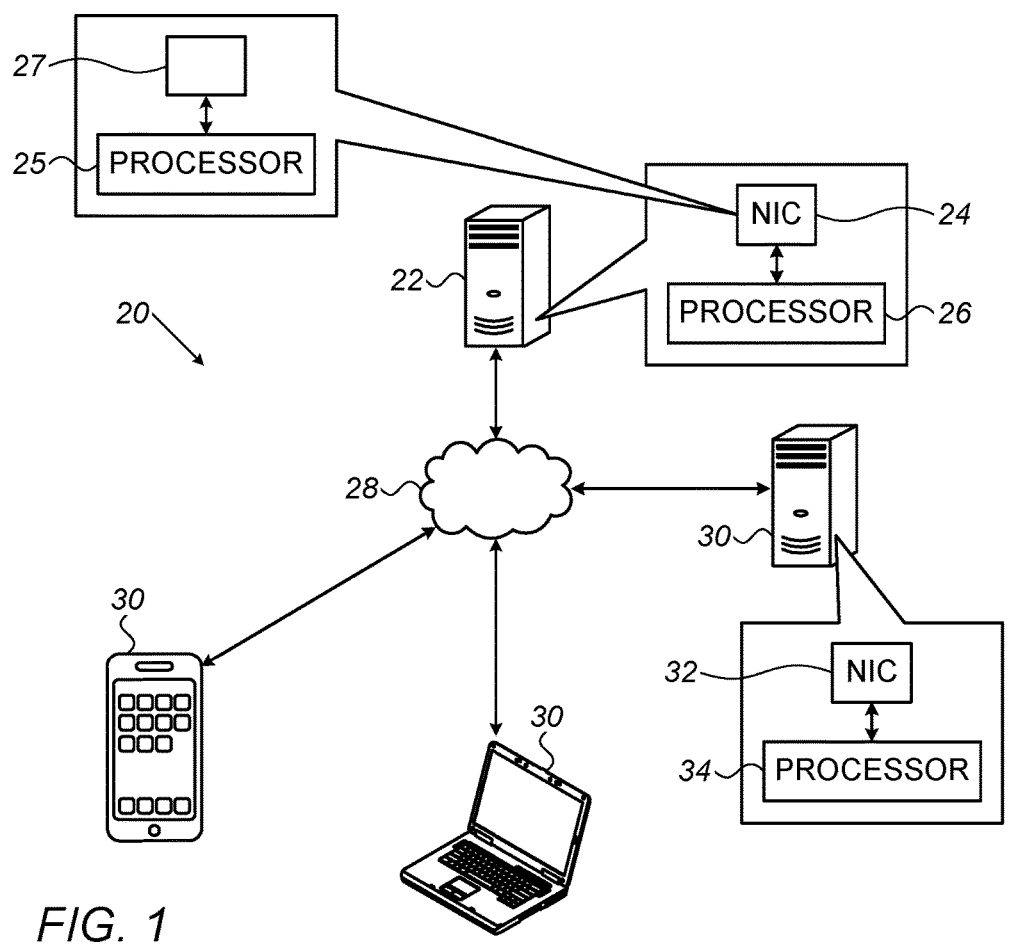
FIG. 1 is a schematic illustration of a system for defending against denial-of-service (DoS) attacks, in accordance with some embodiments of the present invention.

Embodiments described herein provide techniques for defending against denial-of-service (DoS) attacks that are particularly suited for RDMA protocols, along with systems that implement these techniques.

By way of introduction, it is noted that each given computer allocates a separate hardware or software resource known as a Queue Pair (QP), which includes a Send Work Queue and a Receive Work Queue, as the endpoint for each respective RDMA connection in which the computer participates. Each QP is identified by a corresponding QP Number, and there is a one-to-one correspondence between QPs and QP Numbers. The setup of each RDMA connection is conducted "out-of-band," using a dedicated QP known as "QP1."

Hence, when using a three-way handshake to set up an RDMA connection between a client and a server, the server must specify a QP Number when indicating to the client, in the server's REP message, that the server is ready to receive data. (Otherwise, the client won't know the endpoint to which the data should go.) Moreover, since the connection setup (or "handshaking") utilizes a different QP (namely, QP1) from the QP that is to be used for data communication, the client may send data to the server even before the server receives the client's RTU message. This means that it is not sufficient to merely specify a QP Number to the client in the REP message; rather, the server must actually allocate the QP having the specified QP Number, and post receive buffers in memory to the allocated QP, before indicating to the client, in the REP message, that the server is ready to receive data.

Since, as described above, a three-way handshake requires that the server allocate hardware and/or memory resources to each requested RDMA connection before the client is required to send an RTU message to the server, malicious clients engaged in a DoS attack may tie up the resources of the server with incomplete, or "hanging," connection setups. For example, a malicious client may bombard the server with connection requests, without replying to the REP messages received in response to these requests. Alternatively, a malicious client may bombard the server with connection requests that indicate a spurious source network address, such that the REP messages from the server are never even received.

To address this challenge, embodiments of the present invention provide alternate connection-setup protocols for RDMA, which reduce the risk of a DoS attack. In these protocols, a server allocates a QP for a given client only upon receiving, from the client, a message, such as a connection request, that includes a suitable cookie, i.e., a cookie satisfying any suitable one or more criteria. While a legitimate client—if properly configured—will send such a cookie to the server, malicious clients engaged in DoS attacks will not send such a cookie. Hence, the server is less likely to allocate a QP to a malicious client. Typically, the server requires the cookie only if the server identifies a large number of open connections with the server, which indicates that a DoS attack may be underway.

When practicing this defense technique, the server checks each incoming connection request for a suitable cookie. If such a cookie is found, the server allocates a QP, informs the requesting client of the corresponding QP Number, and indicates that the server is ready to receive data communication at the allocated QP. On the other hand, if no cookie is found, the server returns a reject message (or any other type of message) that includes a suitable cookie, indicating to the client that the server requires that this cookie—or another cookie derived therefrom—be returned to the server in a subsequent message. Typically, the server generates this cookie by hashing the current time with one or more other values, such as an identifier (e.g., an Internet Protocol (IP) address) of the client, the client's QP Number for the connection, and/or a service identifier of the requested RDMA service. (If an unsuitable cookie is found in the connection request indicating that the client is likely an attacker—the server may return a reject message that does not include any cookie.)

If the client is legitimate and is properly configured, the client will, upon receiving the cookie from the server, send the server another message that includes the cookie received from the server, or another cookie otherwise derived from the received cookie. The server will then allocate a QP to the connection. On the other hand, if the client is engaged in a DoS attack, the client will not check the reject message for the necessary cookie, since such an operation is prohibitively time-consuming in the context of a DoS attack, which requires that a rapid stream of connection requests be sent to the server. Furthermore, in many cases, as noted above, an attacking client specifies a spurious source network address in its connection request, such that the client will never even receive the necessary cookie from the server.

In some embodiments, subsequently to receiving the second cookie from the client, the server allocates a QP, and then sends the client another message that indicates the corresponding QP Number and informs the client that the server is ready to receive data communication at the allocated QP. The client then replies with another message to the server, indicating that the client is ready to receive data communication from the allocated QP. There are thus a total of five messages exchanged in the connection setup: a first message from the client requesting a connection, a second message from the server with the first cookie, a third message from the client with the second cookie, a fourth message from the server with the QP Number and an indication that the server is ready to receive data, and a fifth message from the client indicating that the client is ready to receive data. This sequence of messages may be referred to as a "five-way handshake." An advantage of this connection-setup protocol is that the server need not allocate any resources, including memory resources, to a connection, before the legitimacy of the requesting client is established.

In other embodiments, upon receiving a connection request, the server reserves a QP Number, and then notifies the client of this QP Number when sending the first cookie to the client. However, the server doesn't actually allocate the corresponding QP until after the client sends the second cookie to the server. In such embodiments, a total of four messages are exchanged in the connection setup: a first message from the client requesting a connection, a second message from the server with the first cookie and the QP Number, a third message from the client with the second cookie and an indication that the client is ready to receive data, and a fourth message from the server indicating that the server is ready to receive data. Although, in such embodiments, the server needs to dedicate memory resources for the reserved QP Number before the legitimacy of the client is established, this "four-way handshake" requires one fewer message than the five-way handshake described above.

Although the present description relates mainly to RDMA, it is noted that the connection-setup techniques described herein may also be practiced with other connection protocols. In particular, the techniques described herein may be particularly suited to those connection protocols that require the server to allocate a connection endpoint, such as a QP or any other hardware or software resource analogous to a QP, before the legitimacy of the client can be ascertained.

System Description

Reference is initially made to FIG. 1, which is a schematic illustration of a system 20 for defending against DoS attacks, in accordance with some embodiments of the present invention. System 20 comprises a server 22 and one or more (legitimate, i.e., not malicious) client devices (or "clients") 30. Clients 30 communicate with server 22 over a computer network 28, such as the Internet.

Server 22 comprises a network interface, such as a network interface controller (NIC) 24, comprising one or more communication ports 27, such as electrical or electro-optical ports. Server 22 further comprises a processor 26, which is typically a programmed digital computing device comprising a general central processing unit (CPU). Processor 26 is configured to receive messages from clients 30, and pass messages to clients 30, via ports 27 of NIC 24. (Each such message may include any suitable number of packets.) Additionally, processor 26 may be configured to process any connection requests from clients 30 (received via ports 27) as described below, such as to reduce the number of connections established with malicious clients.

Alternatively or additionally, NIC 24 may comprise a processor 25, configured to process connection requests from clients 30 as described below. Alternatively or additionally, another processor, located on another server remotely from server 22, may be configured to process, as described below, any requests for connection to server 22, and/or to other servers, that may be received via the communication ports of another network interface. (In this regard, it is noted that some communications standards, such as Infiniband, allow for a third party to manage connection setups.) Such a processor may, for example, be cooperatively networked or clustered with processor and/or processor 25, and may exchange connection-setup messages with the requesting clients directly, and/or via the server. As yet another alternative, processor 26, processor 25, and/or one or more other remote processors may cooperatively perform the processing of connection requests as described below.

(Notwithstanding the various alternatives detailed above, for simplicity, the present description generally assumes that server 22, processor 26, or simply "the processor" performs the various techniques described below.)

Similarly to server 22, each client 30 comprises a network interface, such as a NIC 32, which comprises one or more communication ports (not shown), and a processor 34. Processor receives messages from server 22, and passes messages to server 22, via the communication ports of NIC 32. Processor 34 (and/or a processor of NIC 32) is configured to set up connections with server 22 using the techniques described hereinbelow.

The connection-setup functionality of any one or more of the aforementioned processors may be implemented in hardware, e.g., using one or more Application-Specific Integrated Circuits (ASICs) or Field-Programmable Gate Arrays (FPGAs). Alternatively or additionally, the connection-setup functionality of any one or more of the aforementioned processors may be implemented at least partly in software. For example, any of the aforementioned processors may be a programmed digital computing device comprising a CPU, random access memory (RAM), non-volatile secondary storage, such as a hard drive or CD ROM drive, network interfaces, and/or peripheral devices. Program code, including software programs, and/or data are loaded into the RAM for execution and processing by the CPU and results are generated for display, output, transmittal, or storage, as is known in the art. The program code and/or data may be downloaded to the processor in electronic form, over a network, for example, or it may, alternatively or additionally, be provided and/or stored on non-transitory tangible media, such as magnetic, optical, or electronic memory. (Such program code may, for example, be included in the driver software that controls NIC 24 or NIC 32.) Such program code and/or data, when provided to the processor, produce a machine or special-purpose computer, configured to perform the tasks described herein.

Figure 2A:
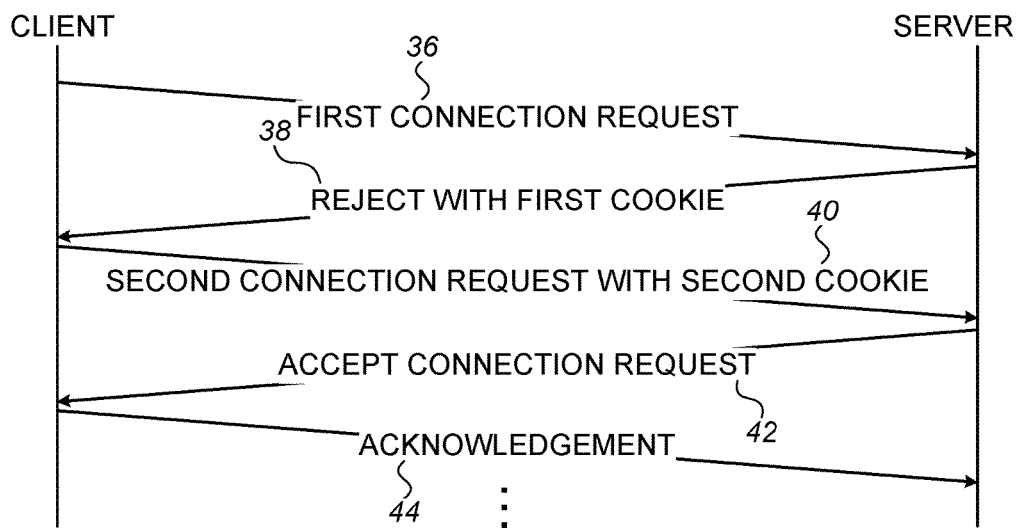
FIG. 2A is a schematic illustration of a five-way handshake for establishing a connection between a server and a client, in accordance with some embodiments of the present invention.

Reference is now made to FIG. 2A, which is a schematic illustration of a five-way handshake for establishing a connection, or "communication session," between server 22 and a client 30, in accordance with some embodiments of the present invention.

First, the client sends, to the server, a first connection request 36 to establish a connection between the client and the server. The server receives first connection request 36 from the client, and then checks the first connection request for a suitable cookie. In response to ascertaining that the first connection request does not include any suitable cookie, the server sends, to the client device, a reject message 38 that indicates a refusal to establish the connection and includes a first cookie. Typically, the server sends reject message 38 to the client without dedicating a QP, or any other resources (such as memory resources), to the first connection request.

The client receives reject message 38 from the server. Subsequently, in response to receiving the reject message with the first cookie, the client sends, to the server, a second connection request 40 to establish a connection between the client and the server, second connection request 40 including a second cookie. Typically, the client first extracts the first cookie from the reject message, and then derives the second cookie from the first cookie. In some embodiments, the value of the second cookie is derived from the value of the first cookie, in that the value of the second cookie is identical to that of the first cookie. In other embodiments, the client derives the value of the second cookie from the value of the first cookie by computing the value of the second cookie as a function—typically a simple function—of the value of the first cookie. For example, the client may compute the value of the second cookie by incrementing the value of the first cookie by one.

It is noted that the server need not necessarily include the first cookie in a reject message. Rather, the server may include the first cookie in any suitable message, which the server may then send to the client without allocating any resources to the connection request. Such a message may be referred to as a "challenge," in that the message challenges the client to return, to the server, another cookie that is derived from the first cookie.

It is further noted that, typically, the server challenges the client only if the server ascertains that the connection request received from the client does not include any cookie at all. If, on the other hand, the connection request includes an unsuitable cookie (i.e., a cookie that does not satisfy the criteria), the server may simply refuse the connection, and send the client a reject message that does not include any cookie. (The presence of an unsuitable cookie indicates that the client may be malicious, in that the client may be attempting to establish a connection using a stolen or randomly-generated cookie.)

The server receives second connection request 40 from the client device, and ascertains that the second request includes the second cookie, and that the second cookie is suitable. (Even though the server does not retain the value of the first cookie, the second cookie may be deemed by the server to be suitable, as long as the client has properly derived the second cookie from the first cookie.) In response to ascertaining that the second cookie is suitable, the server allocates a QP. The server then sends the client an accept message 42 (which is the fourth message of this five-way handshake), which indicates that the server accepts the connection request, by indicating the QP Number of the allocated QP, and further indicating that the server is ready to receive data at the allocated QP. Subsequently, the client sends an acknowledgement message 44 to the server, in which the client indicates that the client is ready to receive data from the allocated QP. Subsequently, data communication may be exchanged via the newly-allocated QP. For example, the client may request to download content from the server, and the server, may, in response, transmit the requested content to the client.

Figure 2B:
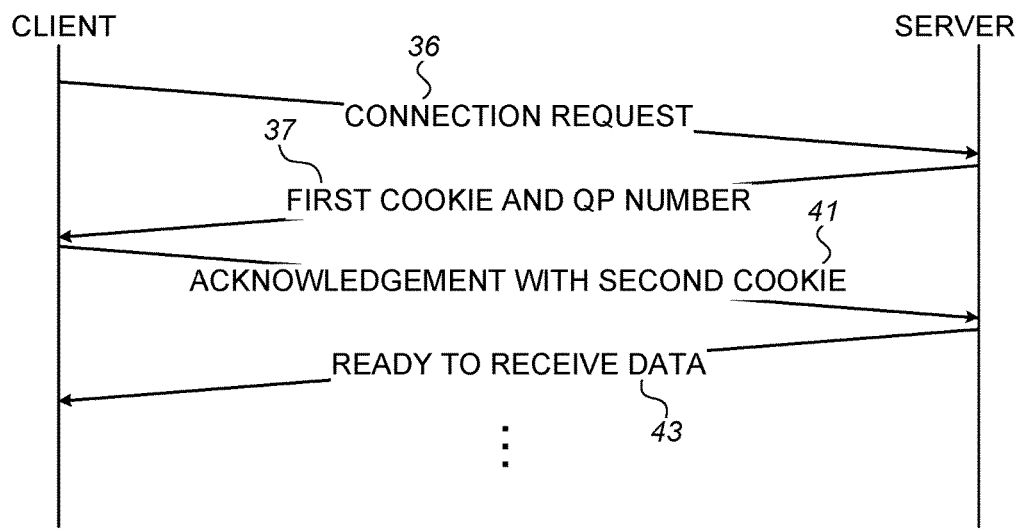
FIG. 2B is a schematic illustration of a four-way handshake for establishing a connection between a server and a client, in accordance with some embodiments of the present invention.

Reference is now made to FIG. 2B, which is a schematic illustration of a four-way handshake for establishing a connection between server 22 and a client 30, in accordance with some embodiments of the present invention.

The four-way handshake of FIG. 2B begins, as in the five-way handshake of FIG. 2A, with a connection request 36 from the client. However, unlike in the case of the five-way handshake, the server does not totally refuse the connection request; rather, even though the server does not allocate a QP to the request, the server designates (or "reserves") a QP Number. The server then passes this QP Number, along with the first cookie, to the client, in a challenge message 37. Upon receiving this message, the client passes an acknowledgement message 41 to the server, which indicates that the client is ready to receive data from the QP having the specified QP Number, and which includes the second cookie. In response to ascertaining that the second cookie is suitable, the server allocates a QP having the designated QP Number, and then indicates to the client, in a fourth message 43, that the server is ready to receive data at the allocated QP. Subsequently, as in the case of the five-way handshake, data communication may be exchanged between the server and the client, via the allocated QP.

It is noted that the first and second cookies may share a common name, or may have different names. Any suitable string(s) may be used for the cookie name(s), provided that each of the server and the client is configured to look for (and, optionally, use) the cookie name that is used by the other party. That is, the server may use any suitable name for the first cookie, provided that the client is configured to look for this name (or for a group of names that includes this name) in incoming challenges, and, if the name is found in a given challenge, use the name, and/or the accompanying cookie value, to derive another cookie to be sent to the server. Likewise, the client may use any suitable name for the second cookie (this name being derived from the first cookie name, or being independent therefrom), provided that the server is configured to look for this name (or for a group of names that includes this name) in the relevant incoming messages from the client.

Reference is now made to FIG. 3, which is a flow diagram for a method 46 for defending against a DoS attack, this method being practiced by processor 26 of server 22 (and/or by another processor managing connections setups for the server, as described above), in accordance with some embodiments of the present invention. Method 46 corresponds to the five-way handshake of FIG. 2A.

By way of general overview, in method 46, processor 26 repeatedly receives and processes a respective RDMA connection request. For each request, if the processor does not identify a significant risk in acceding to the request, the processor opens a connection with the requesting client. Otherwise, the processor challenges the client, by requiring a suitable cookie from the client, as described above. In parallel to performing method 46, the processor may process connection requests over other connection protocols, using any suitable techniques for DoS-attack prevention, including, for example, the techniques described herein. Alternatively or additionally, in parallel to practicing method 46, the processor may communicate with any number of clients, over any number of connections that have already been opened.

The processor receives each RDMA connection request at a receiving step 48. Next, the processor checks, at a first checking step 52, whether the number of open connections with the server exceeds a suitable predefined threshold. (Typically, only the number of open RDMA connections is considered.) If yes, the processor challenges the client, as described below. Otherwise, the processor accepts the connection request, by allocating a QP for the connection at a QP-allocating step 62. The processor then sends the QP Number of the QP to the client, and indicates that the server is ready to receive data over the connection, at a QP-Number-indicating step 64. Next, the processor receives an acknowledgement from the client, indicating that the client is ready to receive data over the connection, at an acknowledgement-receiving step 66.

Since the process of challenging a client increases the time required for a connection to be established with the client, a given client is typically challenged only if the processor identifies a relatively large number of open connections with the server, indicating that a DoS attack may be underway. (In such a case, the increased time to establish a connection is outweighed by the potential benefit of warding off a DoS attack.) Hence, the threshold used in first checking step 52 is typically relatively large. In some cases, however, the threshold used in first checking step 52 may have a small value, such as zero, or first checking step 52 may be omitted, with all requesting clients being challenged.

To challenge the client, the processor first checks, at a second checking step 53, if the connection request includes a cookie. If not, the processor, at a cookie-generating step 58, generates a suitable cookie. Next, the processor, at an attaching step 60, attaches the cookie to a reject message, and then sends the reject message to the client at a rejecting step 61. Alternatively, as described above with reference to FIG. 2A, the processor may attach the cookie to any other suitable type of message, and then send this message to the client. In any case, given that the request from the client did not include a suitable cookie, a QP is not allocated.

In some embodiments, the processor generates a cookie at cookie-generating step 58 by computing a hash of the current time with one or more other values, such as an identifier (e.g., the IP address) of the client, and then assigning this hash to the value of the cookie. (As described above, the cookie may have any suitable name.) Alternatively, the processor may combine the current time with the identifier, and/or combine any other suitable values with each other, using any suitable mathematical function.

In this regard, it is noted that the processor may identify any relevant time as the "current time," with any suitable degree of precision. For example, the processor may round down, to the nearest second, half-minute, or minute, the timestamp of the request, the time at which the request was received, or the time at which the value of the cookie is computed. In any case, basing the value of the cookie on the current time helps prevent a malicious client from using a stolen cookie to establish a connection with the server, since, by the time the cookie is stolen and used, the cookie may have become stale. Similarly, basing the value of the cookie on the client's identifier helps prevent a malicious client (which has a different identifier) from using a stolen cookie.

Returning now to second checking step 53, if the processor identifies a cookie in the connection request, the processor next checks if the cookie is suitable. Typically, to do this, the processor first computes, at an expected-cookie-computing step 55, one or more expected cookies. These cookies are "expected," in that, assuming that the client recently received a cookie generated at cookie-generating step 58, the processor expects the client to return at least one of these cookies. For example, for embodiments in which the generated cookie is a hash of the current time and an identifier of the client, the value of each expected cookie may be a hash of a respective prior time and the identifier of the client. (If the client is required to perform an operation on the cookie received from the server, the server may perform the same operation on each of these hashes.)

The processor then checks, at a third checking step 56, whether the cookie in the connection request matches one of these expected cookies. If yes, the processor accepts the connection request, and then performs QP-allocating step 62, QP-Number-indicating step 64, and acknowledgement-receiving step 66. Otherwise, the processor rejects the connection at rejecting step 61, without providing the client with the necessary cookie.

As a particular example, at expected-cookie-computing step 55, the processor may compute five hashes $\{H_0, H_1, \ldots H_5\}$, where each hash $H_i$ of these hashes combines the identifier of the client with the time $T-i*(1 \text{ minute})$, where T is the current time rounded down to the nearest minute. The processor may then compute five expected cookies $\{C_0, C_1, \ldots C_5\}$, where each $C_i$ includes, as its value, the corresponding hash $H_i$. For example, if the server receives a connection request from the client at 9:01:30, the server may compute five hashes from the respective time-values of 9:01, 9:00, 8:59, 8:58, and 8:57, and then compute a respective expected cookie from each of these hashes. If the server previously sent the client a cookie generated from the time-value of 9:00, and the client then returned this cookie to the server, the processor may identify that this cookie matches the second expected cookie, and hence, the processor may establish a connection with the client.

(More generally, at third checking step 56, the processor may check if the cookie identified in the connection request satisfies any one or more criteria. For example, the processor may check if the cookie has a particular name, or any name that matches a particular pattern, and/or a particular value, or any value that satisfies certain criteria.)

It is noted that FIG. 3 assumes a scenario in which the server is available for any client that the server deems to be legitimate. If, on the other hand, the server were to be unavailable even for legitimate clients (e.g., due to insufficient resources to handle more connections), the server might send a "standard" reject message, which does not include a cookie, to any client requesting a connection. In such a scenario, there is typically no need for the server to check incoming connection requests for a suitable cookie.

It is further noted that method 46 may be adapted for the four-way handshake of FIG. 2B. For example, in addition to generating a cookie at cookie-generating step 58, the processor may designate a QP Number, and then send the designated QP Number, along with the generated cookie, to the client. (The cookie may be generated—e.g., using a hash function—from the designated QP Number, alternatively or additionally to the other parameters described above.) As another example, upon receiving a suitable cookie from a client and allocating a QP accordingly, the processor need not perform QP-Number-indicating step 64 (since the client is already aware of the QP Number), or acknowledgement-receiving step 66. Rather, to complete the setup of the connection, the processor need only indicate to the client that the processor is ready to receive data communication.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. Apparatus, comprising:
one or more communication ports; and
a hardware processor, configured to establish a Remote Direct Memory Access (RDMA) connection between a client device and a server by:
receiving via the communication ports, from the client device, a first message indicating a request to establish the connection,
ascertaining that the first message does not include any cookie satisfying one or more criteria,
in response to ascertaining that the first message does not include any cookie satisfying the one or more criteria, designating a Queue Pair (QP) Number for the connection without allocating a QP having the designated QP Number,
sending, to the client device, a second message that includes a first cookie and indicates the designated QP Number,
subsequently receiving, from the client device, a third message,
ascertaining that the third message includes a second cookie, and that the second cookie satisfies the one or more criteria,
in response to ascertaining that the second cookie satisfies the one or more criteria, allocating the QP on the server, and
sending, to the client device, a fourth message indicating that the server is ready to receive data communication at the allocated.

2. The apparatus according to claim 1,
wherein the processor is configured to ascertain that the first message does not include any cookie satisfying the one or more criteria by ascertaining that the first message does not include any cookie at all, and
wherein the processor is configured to send the second message that includes the first cookie in response to ascertaining that the first message does not include any cookie at all.

3. The apparatus according to claim 2, wherein the processor is further configured:
to receive, from another client device, another request to establish another connection between the other client device and the server,
to ascertain that the other request includes a third cookie that does not satisfy the one or more criteria, and
to send to the other client device, in response to ascertaining that the other request includes the third cookie that does not satisfy the one or more criteria, another message that indicates a refusal to establish the other connection and does not include any cookie.

4. The apparatus according to claim 1, wherein the processor is further configured to compute the first cookie from: a current time, and an identifier of the client device.

5. The apparatus according to claim 1,
wherein the processor is further configured to ascertain that a number of open connections with the server exceeds a predefined threshold, and
wherein the processor is configured to designate the QP Number without allocating the QP in response to ascertaining that the number of open connections exceeds the predefined threshold.

6. The apparatus according to claim 1, wherein the third message indicates that the client device is ready to receive communication from the QP.

7. The apparatus according to claim 1, wherein the processor is configured to establish the connection by executing software code.

8. The apparatus according to claim 1, wherein the processor belongs to the server.

9. Apparatus, comprising:
one or more communication ports; and
a hardware processor, configured to establish a Remote Direct Memory Access (RDMA) connection between the processor and a server by:
sending, via the communication ports, a first message indicating a request to establish the connection,
subsequently to sending the first message, receiving a second message that includes a first cookie and indicates a Queue Pair (QP) Number for the connection,
in response to receiving the second message, sending a third message that includes a second cookie having a value that is derived from a value of the first cookie, and
subsequently to sending the third message, receiving a fourth message indicating that the server is ready to receive data communication at a QP, having the QP Number, that was allocated on the server.

10. The apparatus according to claim 9, wherein the value of the second cookie is identical to the value of the first cookie.

11. The apparatus according to claim 9, wherein the third message indicates that the processor is ready to receive communication from the QP.

12. The apparatus according to claim 9, wherein the processor is configured to establish the connection by executing software code.

13. A method, comprising:
receiving, from a client device, a first message indicating a request to establish a Remote Direct Memory Access (RDMA) connection between the client device and a server;
ascertaining that the first message does not include any cookie satisfying one or more criteria;
in response to ascertaining that the first message does not include any cookie satisfying the one or more criteria, designating a Queue Pair (QP) Number for the connection without allocating a QP having the designated QP Number;
sending, to the client device, a second message that includes a first cookie and indicates the designated QP Number;
subsequently, receiving, from the client device, a third message;
ascertaining that the third message includes a second cookie, and that the second cookie satisfies the one or more criteria;
in response to ascertaining that the second cookie satisfies the one or more criteria, allocating the QP on the server; and
sending, to the client device, a fourth message indicating that the server is ready to receive data communication at the allocated QP.

14. The method according to claim 13,
wherein ascertaining that the first message does not include any cookie satisfying the one or more criteria comprises ascertaining that the first message does not include any cookie at all, and
wherein sending the second message that includes the first cookie comprises sending the second message that includes the first cookie in response to ascertaining that the first message does not include any cookie at all.

15. The method according to claim 14, further comprising:
receiving, from another client device, another request to establish another connection between the other client device and the server,
ascertaining that the other request includes a third cookie that does not satisfy the one or more criteria, and
in response to ascertaining that the other request includes the third cookie that does not satisfy the one or more criteria, sending, to the other client device, another message that indicates a refusal to establish the other connection and does not include any cookie.

16. The method according to claim 13, further comprising computing the first cookie from: a current time, and an identifier of the client device.

17. The method according to claim 13, further comprising ascertaining that a number of open connections with the server exceeds a predefined threshold, wherein designating the QP Number without allocating the QP comprises designating the QP Number without allocating the QP in response to ascertaining that the number of open connections exceeds the predefined threshold.

18. The method according to claim 13, wherein the third message indicates that the client device is ready to receive communication from the QP.

19. A method, comprising:
sending, by a client device, a first message indicating a request to establish a Remote Direct Memory Access (RDMA) connection between the client device and a server;
subsequently to sending the first message, receiving a second message that includes a first cookie and indicates a Queue Pair (QP) Number for the connection;
in response to receiving the second message, sending a third message that includes a second cookie having a value that is derived from a value of the first cookie; and
subsequently to sending the third message, receiving a fourth message indicating that the server is ready to receive data communication at a QP, having the QP Number, that was allocated on the server.

20. The method according to claim 19, wherein the value of the second cookie is identical to the value of the first cookie.

21. The method according to claim 19,
wherein the third message indicates that the client device is ready to receive communication from the QP.

* * * * *